US012600324B1

(12) United States Patent
    Clark

(10) Patent No.: US 12,600,324 B1
(45) Date of Patent: Apr. 14, 2026

(54) VEHICULAR PEDAL WITH LATCHING FOOT PAD

(71) Applicant: CTS CORPORATION, Lisle, IL (US)

(72) Inventor: John Clark, Granger, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 18/915,810

(22) Filed: Oct. 15, 2024

(51) Int. Cl.
    *G05G 1/483* (2008.04)
    *B60T 7/06* (2006.01)
    *G05G 1/44* (2008.04)
    *G05G 1/50* (2008.04)

(52) U.S. Cl.
    CPC .................. *B60T 7/06* (2013.01); *G05G 1/44* (2013.01); *G05G 1/483* (2013.01); *G05G 1/506* (2013.01)

(58) Field of Classification Search
    CPC ........ G05G 1/0483; G05G 1/44; G05G 1/506; G05G 1/48; G05G 1/487; G05G 1/60
    See application file for complete search history.

(56) References Cited

U.S. PATENT DOCUMENTS

2016/0004272 A1* 1/2016 Kelly ..................... G05G 1/483
                                                          264/274

FOREIGN PATENT DOCUMENTS

| | | | | | |
|---|---|---|---|---|---|
| CN | 208188726 U | * | 12/2018 | ............. | G05G 1/483 |
| FR | 3058923 A1 | * | 5/2018 | ............. | G05G 1/506 |
| GB | 2102923 A | * | 2/1983 | ............. | G05G 1/487 |
| KR | 19980013516 U | * | 6/1998 | ............. | B60T 7/06 |
| KR | 19980053004 U | * | 10/1998 | ............. | B60T 7/06 |
| WO | WO-2020195117 A1 | * | 10/2020 | ............. | G05G 1/50 |

OTHER PUBLICATIONS

USPTO Machine Translation (retrieved from FIT database) of the Description of FR 3058923 A1, Sender et al., May 25, 2018. (Year: 2025).*

* cited by examiner

*Primary Examiner* — Daniel D Yabut
(74) *Attorney, Agent, or Firm* — Michael Best & Friedrich LLP

(57) ABSTRACT

A method of assembling a vehicular foot pedal includes providing a pedal arm and a foot pad having a front surface configured for engagement by a driver's foot. The foot pad is assembled to a distal portion of the pedal arm along an assembly direction parallel to a normal surface vector of the front surface. The foot pad is latched to the pedal arm by a flexible latch member integral to a rear surface of the foot pad, the flexible latch member extending through a corresponding opening in the pedal arm.

20 Claims, 7 Drawing Sheets

VEHICULAR PEDAL WITH LATCHING FOOT PAD

BACKGROUND

The present invention relates to vehicular foot pedals. Such pedals are constructed with an elongate pedal arm extending from a mounting structure toward a cantilevered distal end configured for engagement by the driver's foot. At the distal end, a foot pad is provided. The foot pad may provide an expanded surface area for engagement by the driver's foot, as compared to the pedal arm. The foot pad may also have a different material construction, e.g., including non-slip material.

SUMMARY

In one aspect, the present disclosure provides a vehicular foot pedal including an elongate pedal arm and a foot pad provided at a distal end of the pedal arm for engagement by a foot of a driver to rotate the pedal arm. The foot pad includes a frontal surface configured to face toward the foot of the driver. A latching system removably secures the foot pad to the pedal arm. The latching system includes a latching member protruded from a rear surface of the foot pad, and a corresponding opening in the pedal arm positioned to receive the latching member in an assembly direction. The latching member comprises a post protruding parallel to the assembly direction and a flexible arm extending from the post transverse to the assembly direction. The flexible arm terminates in a tip portion that sits outside a perimeter of the corresponding opening in a state in which the flexible arm is in a non-deflected state and in which the foot pad is secured to the pedal arm by the latching system.

In another aspect, the present disclosure provides a vehicular foot pedal including an elongate pedal arm including a proximal mounting portion and a distal end. A foot pad is provided at the distal end of the pedal arm, the foot pad having a frontal surface configured for engagement by a foot of a driver to rotate the pedal arm about the proximal mounting portion. A latching system removably secures the foot pad to the distal end of the pedal arm. The latching system includes a latching member protruded from a rear surface of the foot pad and a corresponding opening in the distal end of the pedal arm positioned to receive the latching member in an assembly direction. A flexible arm of the latching member has a first bending stiffness against a force at a free tip portion thereof parallel to the assembly direction and a second bending stiffness, less than the first bending stiffness, against a force at the free tip portion perpendicular to the assembly direction.

In yet another aspect, the present disclosure provides a method of assembling a vehicular foot pedal includes providing a pedal arm and a foot pad having a front surface configured for engagement by a driver's foot. The foot pad is assembled to a distal portion of the pedal arm along an assembly direction parallel to a normal surface vector of the front surface. The foot pad is latched to the pedal arm by a flexible latch member integral to a rear surface of the foot pad, the flexible latch member extending through a corresponding opening in the pedal arm.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
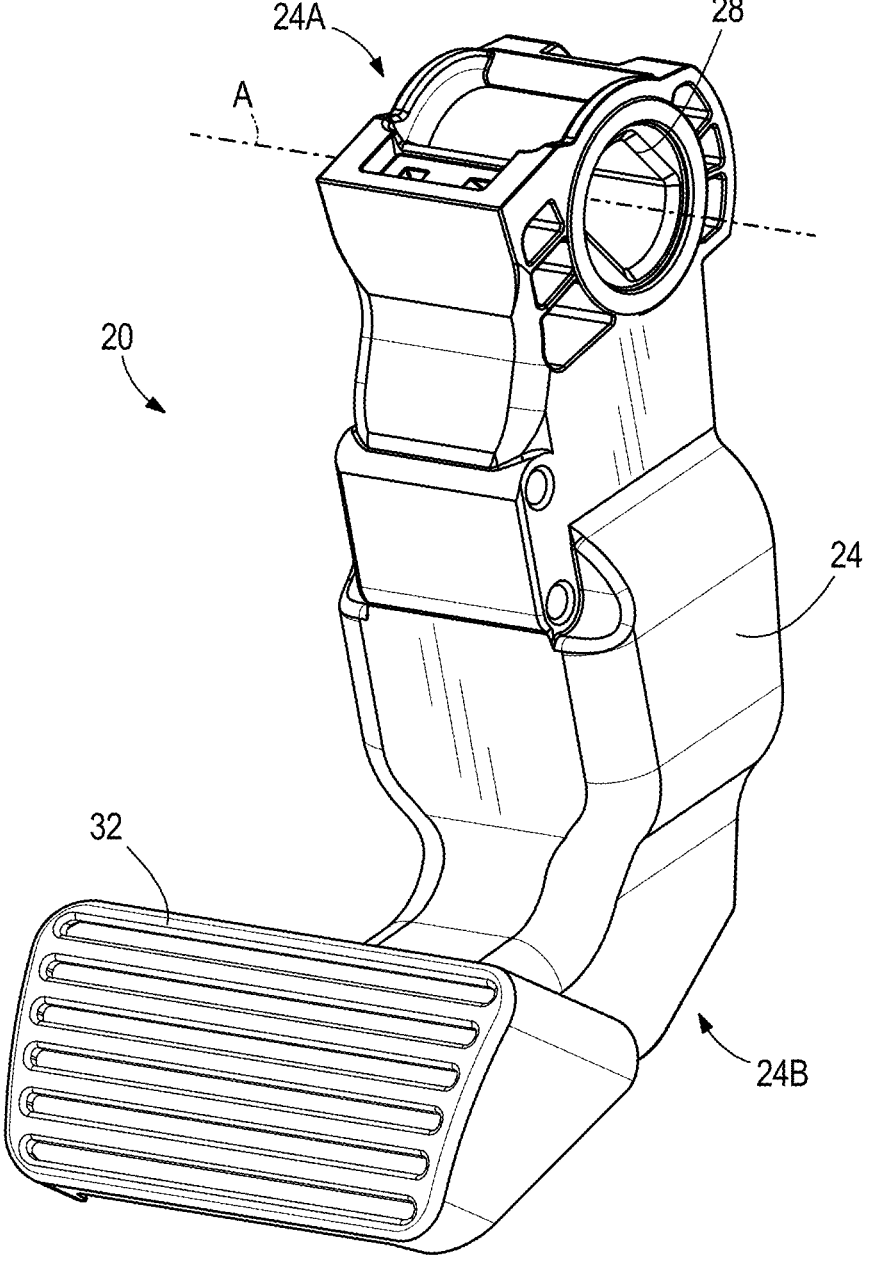
FIG. 1 is a perspective view of a vehicular foot pedal according to the present disclosure.

FIG. 1 illustrates a vehicle including a vehicular foot pedal 20 (e.g., a brake pedal configured to be installed in a vehicle for controlling braking/deceleration of the vehicle at the driver's direction). The vehicular foot pedal 20, referred to hereinafter as "pedal 20," includes a pedal arm 24. The pedal arm 24 has an elongate form, extending from a proximal or upper end 24A to a distal or lower end 24B. The upper end 24A includes a mounting portion with a mounting structure such as the illustrated opening 28. The upper end 24A is configured as a rotational joint, allowing rotational movement about an axis A. In some constructions, the upper end 24A supports a pivot shaft (not shown) at the opening 28. The opening 28 can have a non-circular cross-section (FIG. 2) complementary with an outer surface of the pivot shaft to rotationally secure the two together. The lower end 24B supports a removable foot pad 32 configured to receive a driver's input force for rotation of the pedal 20 about the axis A. The pedal arm 24 acts as a lever, allowing force from the driver at the foot pad 32 to be applied with increased leverage about the axis A through the lever arm provided by the offset between the axis A and the foot pad 32. The pedal 20 can be mechanically coupled to a hydraulic master cylinder to enable an applied driver force to be conveyed (e.g., with amplification) through hydraulic fluid to wheel cylinder(s) to clamp a rotor that rotates with a wheel of the vehicle. In other aspects, the pedal 20 is provided in a brake-by-wire (BBW) system in which the force on the pedal 20 is decoupled from the wheel cylinder(s), and the actuation of the pedal arm 24 is sensed electronically to generate a braking signal for an electronic processor unit, which in turn, actuates a braking actuator that is mechanically independent of the pedal 20.

Figures 2, 3:
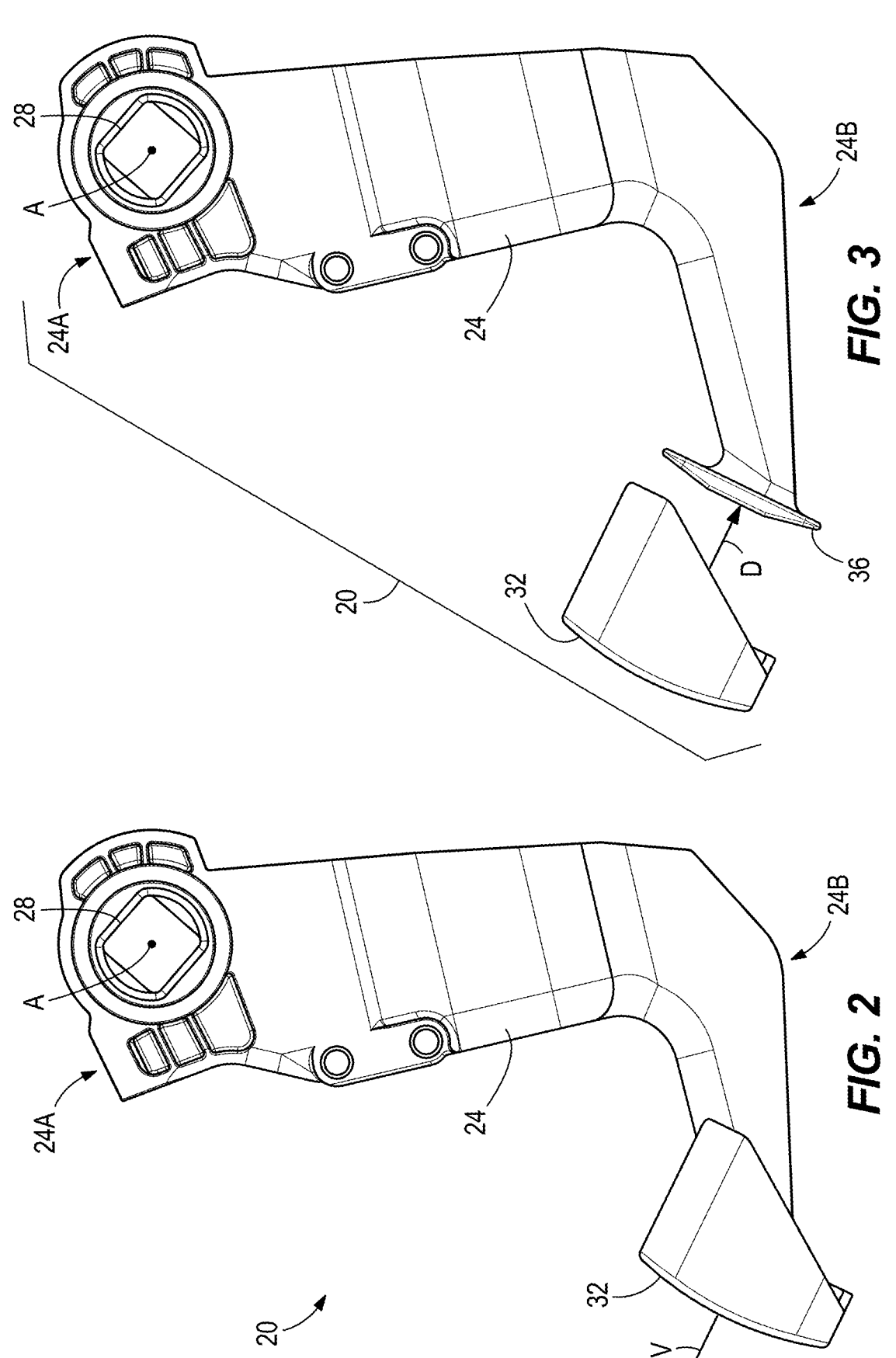
FIG. 2 is a side elevation view of the vehicular foot pedal of FIG. 1.
FIG. 3 is an exploded assembly view of the vehicular foot pedal as shown in FIG. 2.
Figure 4:
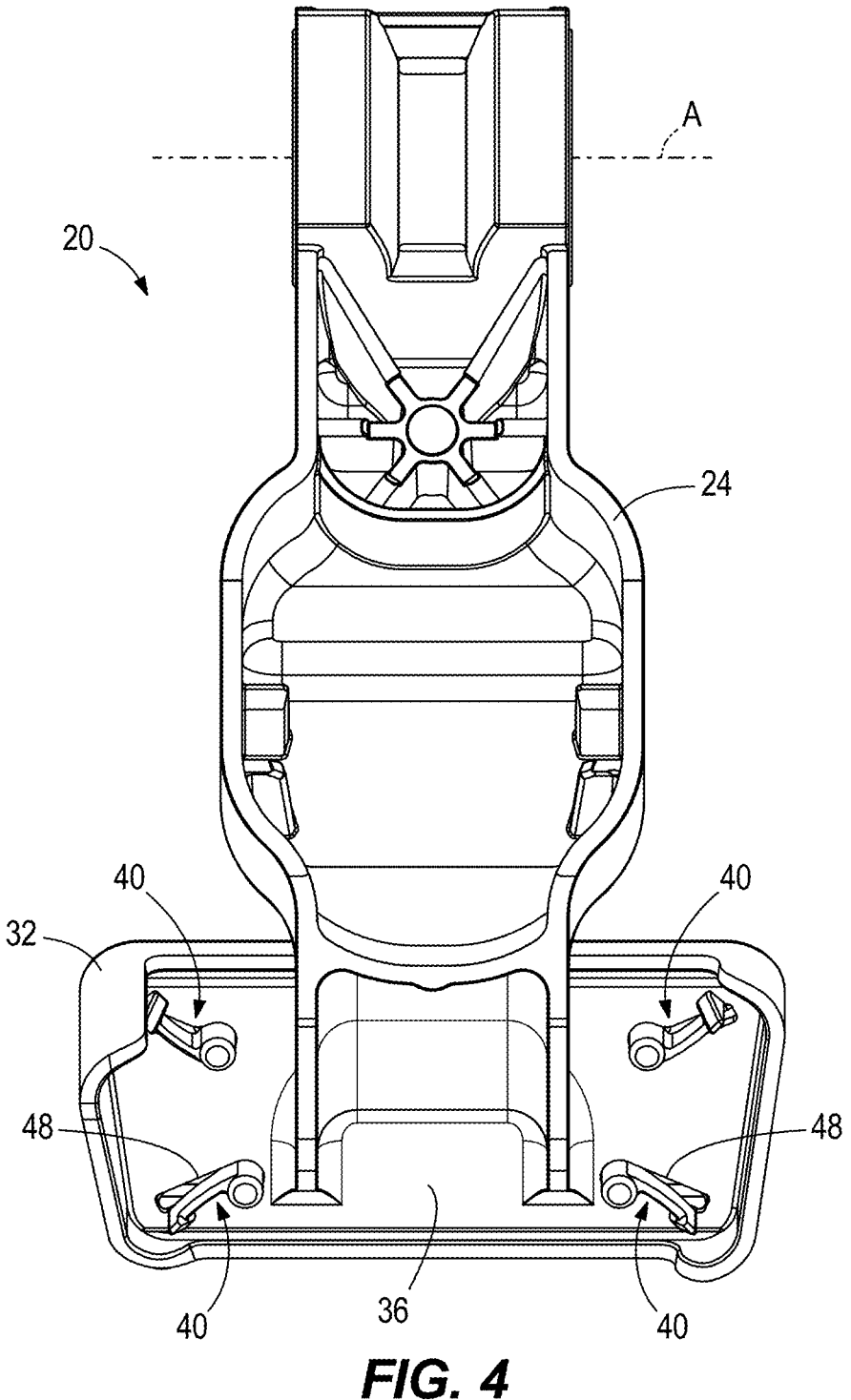
FIG. 4 is a rear elevation view of the vehicular foot pedal of FIGS. 1-3.

The foot pad 32 provides an increased surface area to receive the driver's foot, as compared to the pedal arm 24, or at least a majority thereof. As shown in FIG. 4, the foot pad 32 defines the widest part of the pedal 20 (i.e., measured parallel to the axis A). The foot pad 32 has a generally rectangular or trapezoidal shape including four corners. The foot pad 32 defines a frontal surface configured to receive the driver's foot. Although provided with some curvature in the illustrated construction (e.g., to provide good ergonomics through a range of useful travel), the frontal surface of the foot pad 32 can be considered generally flat. The frontal surface defines a normal surface vector V (FIG. 2). In the case of a curved frontal surface, the normal surface vector V can be taken at a centroid of the foot pad 32. The driver's input force is applied generally opposite the normal surface vector V, driving the foot pad 32 rearward. In this case, "rearward" for the pedal 20 will be generally forward in the context of a conventional vehicle configuration in which the pedal 20 is mounted. In the illustrated construction, the lower end 24B of the pedal arm 24 includes a plate 36 configured to provide a backing for the foot pad 32. For example, the plate 36 has a substantially flat shape extending out substantially perpendicular to an adjacent portion of the pedal arm 24. The plate 36 can be integrally formed as (e.g., molded with) part of the pedal arm 24. In some constructions, the pedal arm 24 is nylon or polypropylene, and may be glass-filled. The plate 36 can have a size and shape generally matching the size and shape of the foot pad 32. However, the plate 36 is covered by the foot pad 32 in an assembled state of the pedal 20. The foot pad 32 can have a different material construction than the plate 36 and may be constructed at least partially of a non-slip material such as rubber.

As described in detail further below, the pedal 20 includes a latching system for removably securing the foot pad 32 to the pedal arm 24. The latching system, which includes one or a plurality of latching members 40, is configured to securely retain the foot pad 32 at the distal end of the pedal 20 with a simple one-step assembly motion and process. For example, the foot pad 32 can be attached solely by movement in an assembly direction D (FIG. 3) toward and against the lower end 24B of the pedal arm 24. The latching system is also highly resistant to accidental detachment, while very simple to detach with specific intentional act(s).

Figure 5:
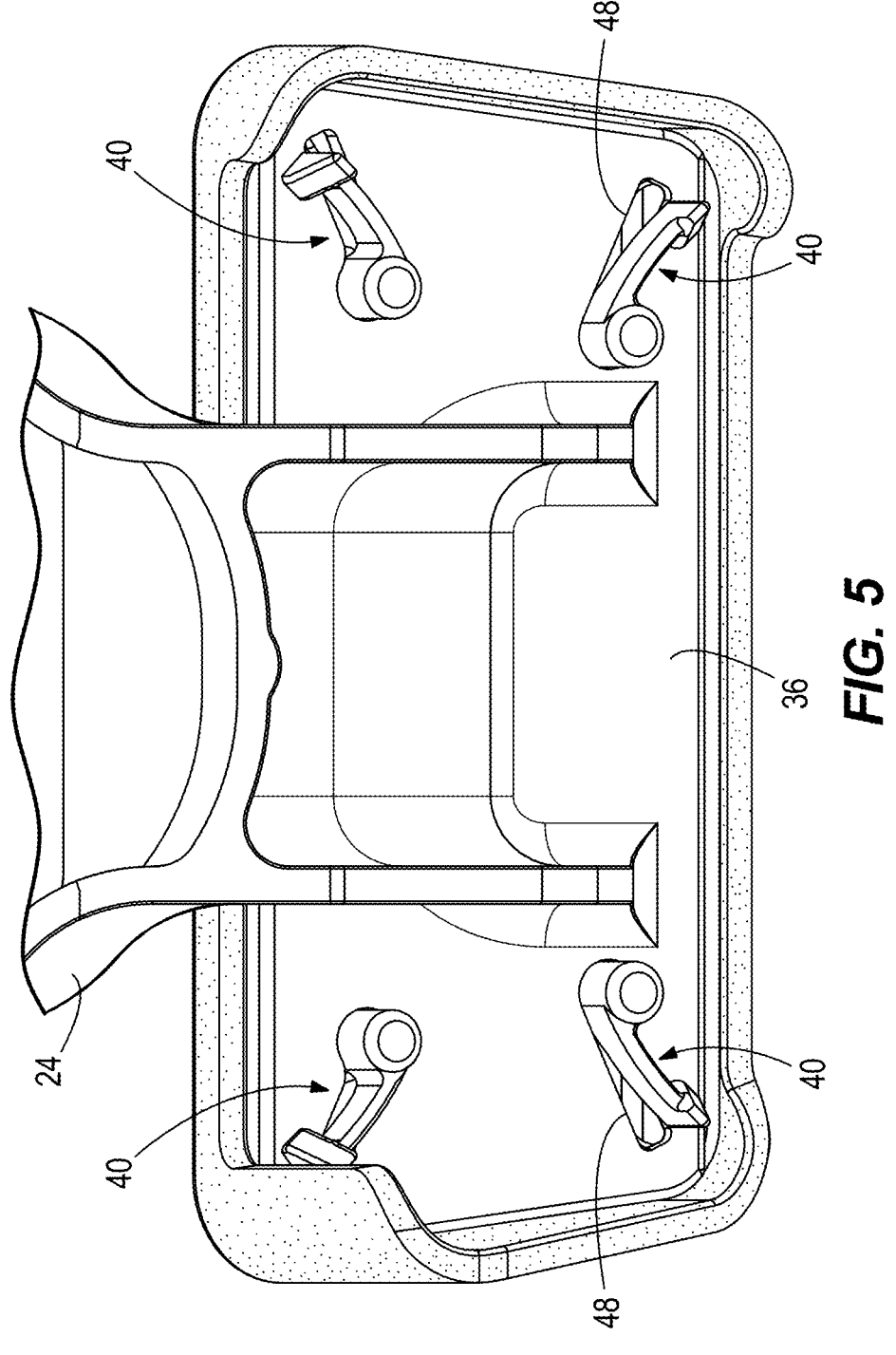
FIG. 5 is a detail view of the pad portion of the vehicular foot pedal as shown in FIG. 4.
Figure 6:
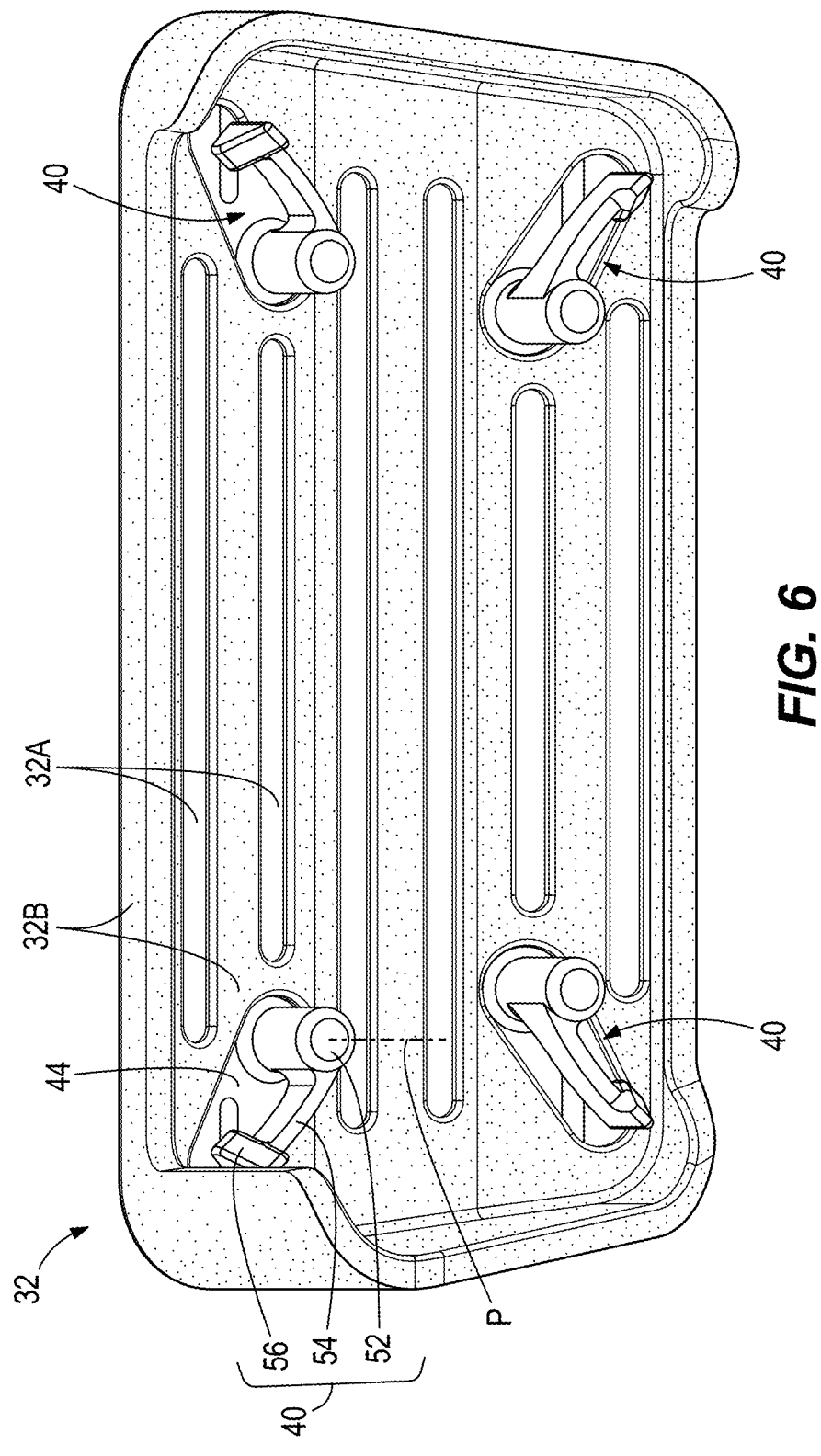
FIG. 6 is a rear elevation view of a removable pad portion of the vehicular foot pedal of FIGS. 1-4.
Figure 7:
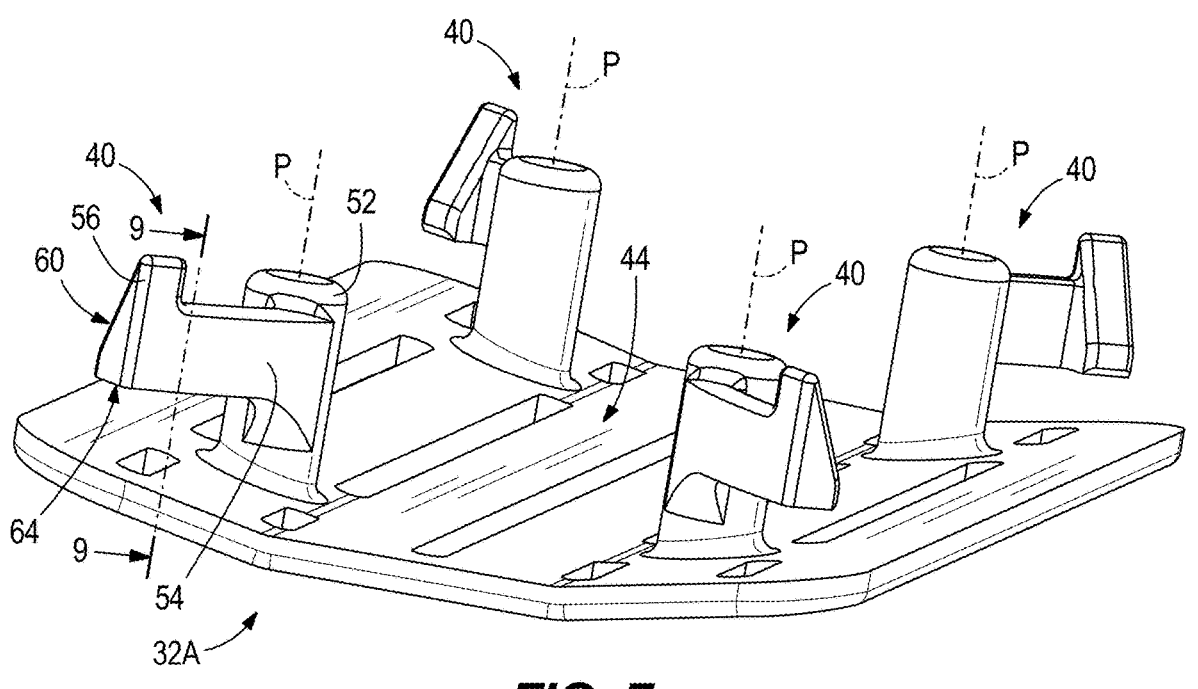
FIG. 7 is a perspective view of a core portion of the removable pad portion.

In the latching system of the illustrated construction, there are a plurality of latching members 40 protruded from a rear surface 44 of the foot pad 32 as shown in FIG. 6, where the foot pad 32 is shown in isolation. The latching members 40 can be integrally formed as (e.g., molded with) part of the foot pad 32. In particular, the latching members 40 can be integrally formed as part of a core portion 32A of the foot pad 32. The foot pad 32, in addition to the core portion 32A, can include a cover 32B (e.g., of a relatively softer and/or grippier material) at least partially covering the core portion 32A. In some constructions, the cover 32B is rubber (e.g., EPDM). The cover 32B can be molded onto the core portion 32A, or alternatively, manufactured separately and stretched over the core portion 32A. FIG. 7 illustrates the core portion 32A of the foot pad 32 by itself, without the cover 32B. The core portion 32A can be nylon, polypropylene, or POM, and may be glass-filled. For each latching member 40, the pedal arm 24 (particularly, the plate 36 in the illustrated construction) includes a corresponding opening 48 (FIGS. 4-5) positioned to receive the latching member 40 in the assembly direction D. However, the latching members 40 have a physical construction that precludes them passing straight through the corresponding openings 48, without deflection. In other words, when the latching members 40 are in a natural at-rest (non-deflected) state, a portion of the latching member 40 defines interference, in the assembly direction D, with the corresponding opening 48 by lying outside a perimeter of the opening 48.

Figure 8:
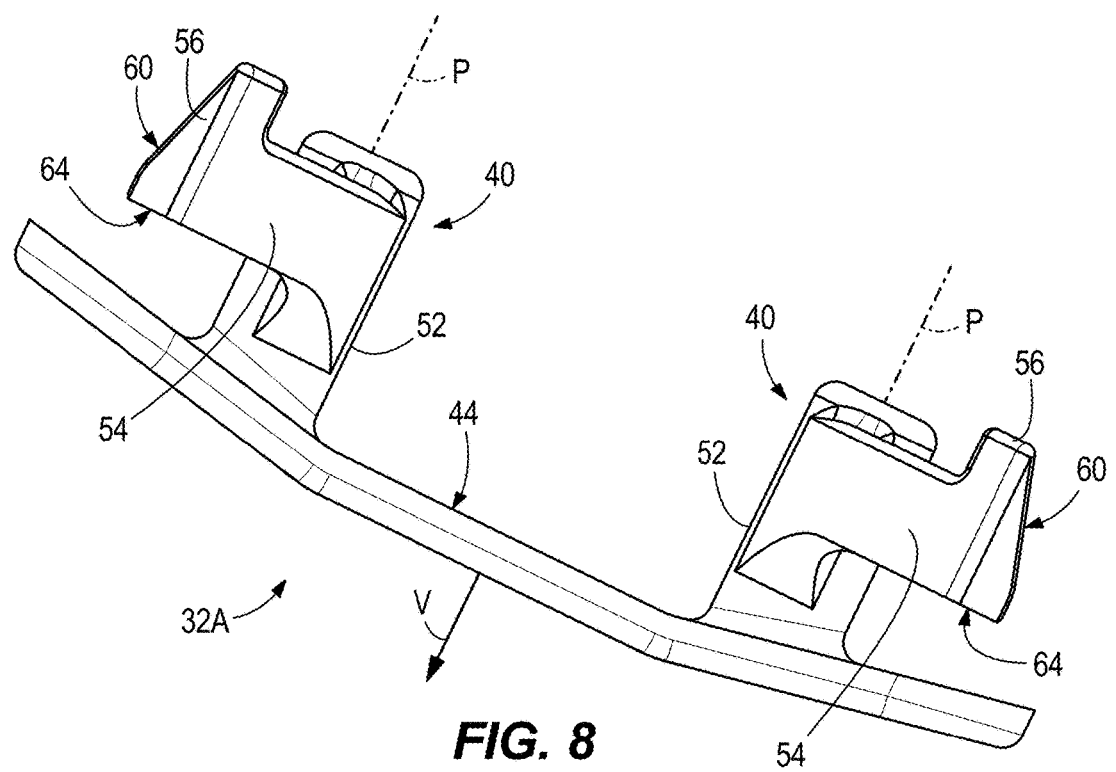
FIG. 8 is a side elevation view of the core portion of FIG. 7.

With particular reference to FIGS. 7 and 8, each latching member 40 comprises a post 52 protruding along a post axis P parallel to the assembly direction D and a flexible arm 54 extending in a transverse direction from the post 52. The flexible arm 54 can define an elongate central axis perpendicular to the post axis P (and to the assembly direction D). The flexible arm 54 can be straight or formed with curvature as shown. The flexible arm 54 of the illustrated construction is curved as viewed parallel to the post axis P. The flexible arm 54 can be formed to extend generally tangentially from the post 52, rather than extending from a central portion of the post 52, as viewed along the post axis P. The flexible arm 54 terminates in a free tip portion 56 that sits outside the perimeter of the corresponding opening 48 when the flexible arm 54 is in a natural at-rest (non-deflected) state and the foot pad 32 is secured to the pedal arm 24 by the latching system. Some or all of the flexible arms 54 extend from the respective posts 52 toward an outer periphery of the foot pad 32, generally away from the centroid of the foot pad 32. As shown in the drawings, the plurality of flexible arms 54 all extend from the respective posts 52 away from each other such that each flexible arm 54 has its tip portion 56 extending toward a respective corner of the foot pad 32.

Figure 9:
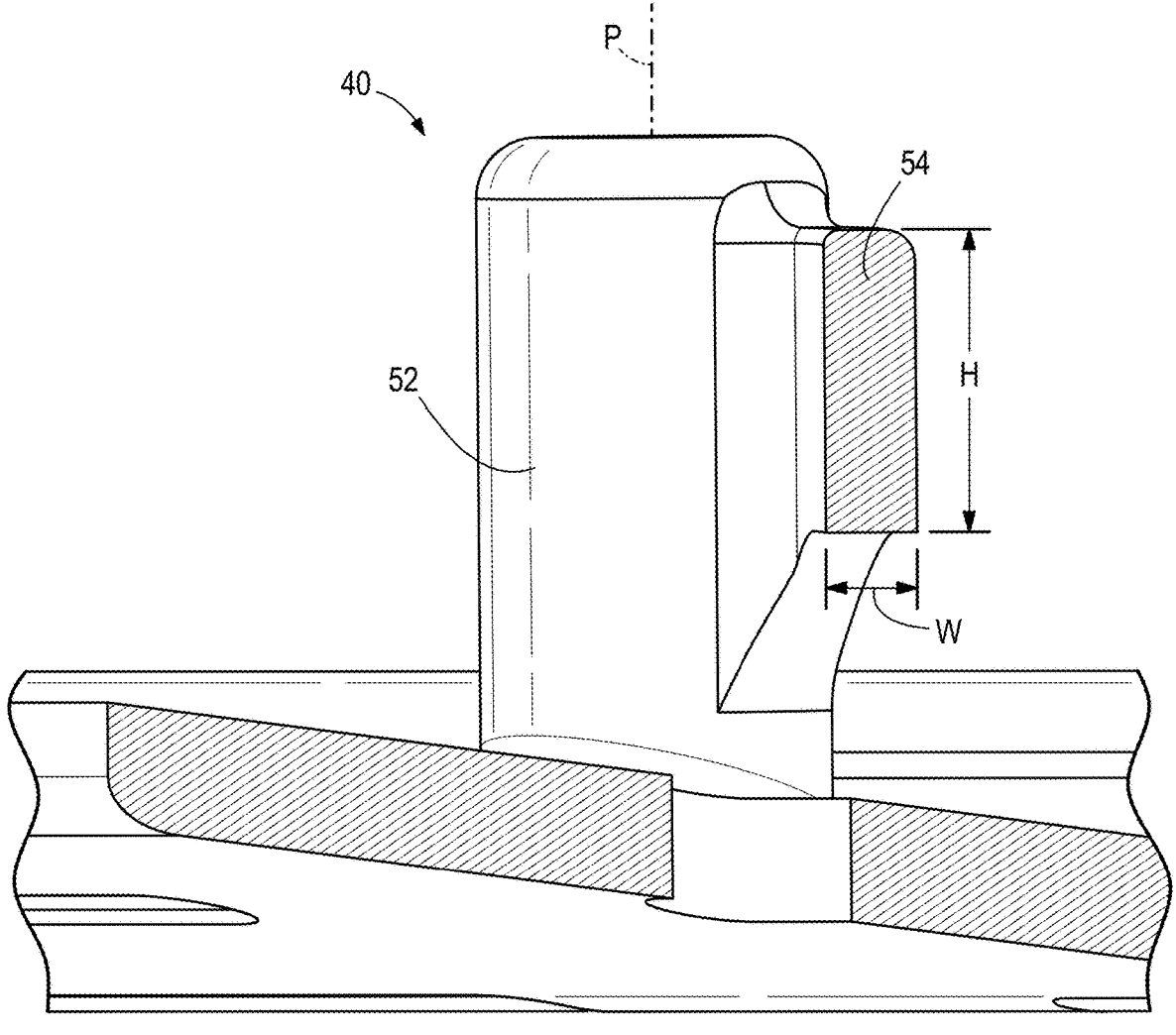
FIG. 9 is a cross-section of a flexible arm of a latching member, taken along line 9-9 of FIG. 7.

The flexible arm 54 has a cross-section (FIG. 9) that provides direction-specific bending stiffness. As shown in FIG. 9, the cross-section of the flexible arm 54 can be of a substantially rectangular shape, defining two perpendicular dimensions, referred to herein as height H and width W. The height H is measured parallel to the post axis P, and the width W is measured perpendicular to the height H. Both the height H and the width W are measured generally perpendicular to a lengthwise extent of the flexible arm 54 between the post 52 and the tip portion 56. In order to provide a substantially increased relative bending stiffness for the latching member 40 against removal of the foot pad 32 from the pedal arm 24, as compared to the bending stiffness that resists the latching deflection to assemble the foot pad 32 to the pedal arm 24, the height H is significantly greater than the width W. For example, the height to width ratio H:W can be at least 2:1, or at least 3:1. In other constructions, the flexible arm 54 has a different relative sizing and/or different shape than that shown. The flexible arm 54 has a first bending stiffness against a force at the tip portion 56 parallel to the assembly direction D, and a second smaller bending stiffness against a force at the tip portion 56 perpendicular to the assembly direction D so that the latching members 40 are more easily deflected (with a lower force) when latching vs. resisting a foot pad removal force opposite the assembly direction D. As will be appreciated, all the latching members 40 are deflected elastically in a sideways direction (perpendicular to the assembly direction D) in the weaker direction of the flexible arm 54, upon joining the foot pad 32 and the pedal arm 24 along the assembly direction D.

To facilitate automatic deflection of all the latching members 40 during assembly, the tip portion 56 defines an overlap with an edge of the corresponding opening 48. The tip portion 56 of each latching member 40 can also be formed with an oblique ramp surface 60. The ramp surface 60 is configured to engage the edge of the opening 48 such that the edge of the opening 48 drives the sideways deflection of the flexible arm 54 during the assembly process. The deflection of each latching member 40 is constrained or focused to the flexible arm 54, rather than the post 52. The post 52 can have a bending stiffness (via material construction and/or sizing) that significantly exceeds the bending stiffness in the flexible arm's width direction. The post 52 can in some constructions have a bending stiffness that exceeds even that of the flexible arm's height-direction bending stiffness. For example, the post 52 can have an outer dimension (e.g., diameter) that is at least three times, or at least four times, the flexible arm width W. It is also noted that, taken parallel to the post axis P and the assembly direction D, the tip portion 56 with the ramp surface 60 can be taller than the post 52. Thus, the tip portions 56 of the respective latching members 40 can establish initial contact with the pedal arm 24 during assembly and provide guidance for alignment. In other constructions, the posts 52 are taller than the tip portions 56, or they may be substantially the same height. When the posts 52 are taller than the tip portions 56, the posts 52 are the first parts to engage the arm 24 (i.e., openings 48) during assembly to control the alignment between the foot pad 32 and the arm 24.

In addition to sufficient side deflection of the latching members 40 during assembly in order to allow passage of the latching members 40 through the openings 48, a predetermined amount of compression along the assembly direction D may be required to achieve a latched position of the foot pad 32 in which a retention or latching surface 64 of each latching member 40 passes fully through the opening 48 and engages a surface of the pedal arm 24 (e.g., plate 36) outside/beyond the opening 48. For example, during the joining the foot pad 32 to the pedal arm 24 along the assembly direction D, the cover 32B is compressed. The cover 32B has elastic properties and is sized to compress in the elastic range for the latching members 40 to reach the latched state. In some constructions, the cover 32B is compressed at least 0.20 mm (0.008 in) for the latching member 40 (e.g., the tip portion 56 thereof) to fully penetrate the corresponding opening 48. The compression in the cover 32B is maintained when latched, and this helps avoid any rattling or looseness in the assembly. In other constructions, elastic resistance to achieving the latched position can be provided in other ways.

When it is desired to remove the foot pad 32 from the pedal arm 24 for any reason, a user may simply engage each one of the latching members 40 to deflect the flexible arm 54 so that the tip portion 56 can pass back through the corresponding opening 48. In other words, the user bends the flexible arm 54 against its weaker width-direction bending stiffness to eliminate the interference between the tip portion 56 and the pedal arm 24 with respect to the assembly direction D. As shown in FIGS. 4 and 5, the latching members 40 can be exposed to the rear of the pedal 20 for operation by a user, without first disassembling any other parts of the pedal 20. With the latching system unlatched, the foot pad 32 can be pulled away from the pedal arm 24 in a direction opposite the assembly direction D. As desired, the foot pad 32 can be re-installed to the pedal arm 24 in the same manner as the initial installation.

Various features and advantages of the invention are set forth in the following claims.

What is claimed is:

1. A vehicular foot pedal comprising:
an elongate pedal arm;
a foot pad provided at a distal end of the pedal arm for engagement by a foot of a driver to rotate the pedal arm, wherein the foot pad includes a frontal surface configured to face toward the foot of the driver; and
a latching system removably securing the foot pad to the pedal arm, wherein the latching system includes a latching member protruded from a rear surface of the foot pad, and a corresponding opening in the pedal arm positioned to receive the latching member in an assembly direction, and
wherein the latching member comprises a post protruding along a post axis parallel to the assembly direction and a flexible arm extending from the post transverse to the assembly direction, wherein the flexible arm terminates in a tip portion that sits outside a perimeter of the corresponding opening in a state in which the flexible arm is in a non-deflected state and in which the foot pad is secured to the pedal arm by the latching system, and
wherein the flexible arm extends generally tangentially from the post as viewed along the post axis.

2. The vehicular foot pedal of claim 1, wherein the tip portion is taller than the post to guide the latching member through the opening.

3. The vehicular foot pedal of claim 1, wherein the tip portion has a ramp surface configured to engage an edge of the opening.

4. The vehicular foot pedal of claim 1, wherein the flexible arm has a first bending stiffness against a force at the tip portion parallel to the assembly direction and a second bending stiffness, less than the first bending stiffness, against a force at the tip portion perpendicular to the assembly direction.

5. The vehicular foot pedal of claim 1, wherein the latching member is one of a plurality of latching members of the foot pad protruded from the rear surface thereof, wherein the plurality of latching members are provided at four corners of the foot pad.

6. The vehicular foot pedal of claim 1, wherein the flexible arm extends from the post toward an outer periphery of the foot pad and away from a centroid of the foot pad.

7. The vehicular foot pedal of claim 1, wherein the foot pad includes a core portion and a rubber cover at least partially covering the core portion.

8. The vehicular foot pedal of claim 7, wherein the rubber cover extends between the core portion and the pedal arm and is sized such that the rubber cover is compressed at least 0.20 mm (0.008 in) for the latching member to fully penetrate the corresponding opening.

9. The vehicular foot pedal of claim 1, wherein the distal end of the pedal arm is integrally formed with a plate having the corresponding opening of the latching system in which the latching member is received.

10. The vehicular foot pedal of claim 1, wherein the latching member is one of a plurality of latching members engageable in a corresponding plurality of openings in the pedal arm, each of the plurality of latching members being protruded from the rear surface of the foot pad, wherein each of the plurality of latching members comprises a post protruding parallel to the assembly direction and a flexible arm that extends from the post transverse to the assembly direction and terminates in a tip portion that sits outside a perimeter of the corresponding one of the plurality of openings in a state in which: the flexible arm is in a non-deflected state, and the foot pad is secured to the pedal arm by the latching system.

11. A vehicular foot pedal comprising:
an elongate pedal arm including a proximal mounting portion and a distal end;
a foot pad provided at the distal end of the pedal arm, the foot pad having a frontal surface configured for engagement by a foot of a driver to rotate the pedal arm about the proximal mounting portion; and a latching system removably securing the foot pad to the distal end of the pedal arm, wherein the latching system includes a latching member including a post protruded along a post axis from a rear surface of the foot pad and a corresponding opening in the distal end of the pedal arm positioned to receive the latching member in an assembly direction, and wherein a flexible arm of the latching member that extends from the post transverse to the assembly direction has a first bending stiffness against a force at a free tip portion thereof parallel to the assembly direction and a second bending stiffness, less than the first bending stiffness, against a force at the free tip portion perpendicular to the assembly direction so that the flexible arm is more easily deflected about the post axis than deflected toward the post axis.

12. The vehicular foot pedal of claim 11, wherein the free tip portion is taller than the post to guide the latching member through the opening, and wherein the free tip portion has a ramp surface configured to engage an edge of the opening.

13. The vehicular foot pedal of claim 12, wherein the flexible arm extends from the post toward an outer periphery of the foot pad and away from a centroid of the foot pad.

14. The vehicular foot pedal of claim 11, wherein the latching member is one of a plurality of latching members of the foot pad protruded from the rear surface of the foot pad, wherein the plurality of latching members are provided at four corners of the foot pad.

15. The vehicular foot pedal of claim 11, wherein the foot pad includes a core portion and a rubber cover at least partially covering the core portion.

16. The vehicular foot pedal of claim 15, wherein the rubber cover extends between the core portion of the foot pad and the distal end of the pedal arm and is sized such that the rubber cover is compressed at least 0.20 mm (0.008 in) for the latching member to fully penetrate the corresponding opening.

17. The vehicular foot pedal of claim 11, wherein the distal end of the pedal arm is integrally formed with a plate having the corresponding opening of the latching system in which the latching member is received.

18. The vehicular foot pedal of claim 11, wherein the free tip portion sits outside a perimeter of the corresponding opening in a state in which: the flexible arm is in a non-deflected state, and the foot pad and the distal end of the pedal arm are joined together by the latching system.

19. A method of assembling a vehicular foot pedal, the method comprising:

providing a pedal arm;

providing a foot pad having a frontal surface configured for engagement by a driver's foot;

assembling the foot pad to a distal portion of the pedal arm along an assembly direction parallel to a normal surface vector of the frontal surface; and latching the foot pad to the pedal arm by a latching member integral to a rear surface of the foot pad and including a post and a flexible arm extending transverse to a post axis defined by the post, the latching member extending through a corresponding opening in the pedal arm, wherein, during latching, a free tip portion of the flexible arm of the latching member is deflected generally about the post axis.

20. The method of claim 19, further comprising, during the assembly of the foot pad to the distal portion of the pedal arm, compressing a rubber covering of the foot pad, and maintaining the compression of the rubber covering when latched.

* * * * *